United States Patent
Morikawa et al.

(10) Patent No.: US 8,330,974 B2
(45) Date of Patent: Dec. 11, 2012

(54) DATA PROCESSING APPARATUS AND DATA PROCESSING METHOD

(75) Inventors: Takeshi Morikawa, Takarazuka (JP); Masaya Hashimoto, Amagasaki (JP); Nobuo Kamei, Amagasaki (JP); Daisuke Sakiyama, Maizuru (JP)

(73) Assignee: Konica Minolta Business Technologies, Inc., Chiyoda-Ku, Tokyo ( * ) Notice: Subject to any disclaimer, the term of this patent is extended or adjusted under 35 U.S.C. 154(b) by 1279 days.

(21) Appl. No.: 10/732,226

(22) Filed: Dec. 11, 2003

(65) Prior Publication Data
US 2005/0041265 A1    Feb. 24, 2005

(30) Foreign Application Priority Data
Aug. 22, 2003  (JP) .................... 2003-298385

(51) Int. Cl.
G06F 3/12    (2006.01)
G06K 15/00   (2006.01)
H04N 1/32    (2006.01)
G06F 3/00    (2006.01)

(52) U.S. Cl. ............. 358/1.15; 358/1.14; 358/468; 710/1

(58) Field of Classification Search ............... 358/1.15, 358/426.02, 1.14, 1.16, 442, 468; 710/20, 710/36, 1, 58; 718/102
See application file for complete search history.

(56) References Cited

U.S. PATENT DOCUMENTS

| | | | | |
|---|---|---|---|---|
| 5,377,016 A * | 12/1994 | Kashiwagi et al. | ........... | 358/403 |
| 5,774,356 A | 6/1998 | Hisatake et al. | | |
| 5,970,223 A * | 10/1999 | Debes et al. | ........... | 358/1.16 |
| 5,970,224 A * | 10/1999 | Salgado et al. | ........... | 358/1.16 |
| 6,058,249 A * | 5/2000 | Matsuda et al. | ........... | 358/1.14 |
| 6,252,681 B1 * | 6/2001 | Gusmano et al. | ........... | 358/468 |
| 6,381,031 B1 | 4/2002 | Mishima | | |
| 6,389,248 B1 * | 5/2002 | Konno et al. | ........... | 399/81 |
| 6,412,022 B1 * | 6/2002 | Kumpf et al. | ........... | 710/1 |
| 6,646,755 B1 * | 11/2003 | Iwai et al. | ........... | 358/1.14 |
| 7,061,639 B2 * | 6/2006 | McGuire et al. | ........... | 358/1.16 |
| 2003/0076525 A1 * | 4/2003 | Hikawa | ........... | 358/1.14 |
| 2003/0081239 A1 * | 5/2003 | Asahi | ........... | 358/1.15 |

FOREIGN PATENT DOCUMENTS

| | | |
|---|---|---|
| EP | 0 618 716 A1 | 10/1994 |
| JP | 4-305777 | 10/1992 |
| JP | 6-291924 A | 10/1994 |
| JP | 8-98034 | 4/1996 |
| JP | 9-219782 | 8/1997 |

(Continued)

*Primary Examiner* — Steven Kau
*Assistant Examiner* — Neil R McLean
(74) *Attorney, Agent, or Firm* — Buchanan Ingersoll & Rooney PC (57) ABSTRACT

A data processing apparatus includes an image reader for reading an original, a receiver capable of receiving an external job transmitted from an outside, a transmitter capable of transmitting image data of the original read by the image reader as a scanning job to an outside, a print device for printing data of the external job received by the receiver, one or a plurality of compressing/expanding devices for compressing the image data of the scanning job or the data of the external job and expanding the compressed data, and a controller. The controller controls execution of processing of the external job and the scanning job by the compressing/expanding devices in accordance with execution status of the external job in cases where a request for processing the data of the external job by the compressing/expanding devices and a request for processing the data of the scanning job by the compressing/expanding devices overlap.

34 Claims, 6 Drawing Sheets

FOREIGN PATENT DOCUMENTS

| | | |
|---|---|---|
| JP | 9-298652 | 11/1997 |
| JP | 10-84452 A | 3/1998 |
| JP | 10-278388 | 10/1998 |
| JP | 11-41429 A | 2/1999 |
| JP | 2001-337810 | 12/2001 |
| JP | 2002-335358 | 11/2002 |

* cited by examiner

DATA PROCESSING APPARATUS AND DATA PROCESSING METHOD

Priority is claimed to Japanese Patent Application No. 2003-298385, filed on Aug. 22, 2003, the disclosure of which is incorporated by reference in its entirety.

BACKGROUND OF THE INVENTION

1. Field of the Invention

The present invention relates to a data processing apparatus and a data processing method preferably used in MFPs (Multi Function Peripherals) having a plurality of functions such as a copy function, a printer function, a scanner function and a facsimile function.

2. Description of Related Art

The following description sets forth the inventor's knowledge of related art and problems therein and should not be construed as an admission of knowledge in the prior art.

MFPs as mentioned above are provided with a plurality of input means to execute the aforementioned multiple functions. The examples of such input means include a receiving portion for receiving a print job transmitted from an external apparatus such as a personal computer via a network, a receiving portion for receiving a facsimile (FAX) job transmitted from an external apparatus such as a FAX apparatus via a communication line network, and an original reading portion for reading originals.

MFPs are further provided with a printer portion for printing, for example, image data read by the aforementioned original reading portion and/or print data transmitted from the aforementioned external apparatus and a transmitting portion for transmitting the image data or the like read by the aforementioned original reading portion to the outside. Furthermore, MFPs are provided with a file memory for storing data inputted from each inputting means.

For the purpose of decreasing the storage capacity of the data to be stored in the file memory, in general, a compressing/expanding device for compressing/expanding the data is provided. The inputted data is transferred to the compressing/expanding device to be compressed, and then this compressed data is stored in the file memory.

In these MFPs, there is a case that a job (external job) transmitted from an external apparatus and a scanning job to transmit image data of an original read by an original reading portion to the outside are inputted simultaneously and that requests of processing both jobs by the compressing/expanding device (a request to use the compressing device at the time of data input and a request to use the expanding device at the time of data output) overlap. For example, it is the case that a request to execute compression or expansion processing of image data of an original by activating a scanning job is made when external job data is being compressed or expanded.

In this case, conventionally, the scanning job is executed after the termination of the external job or between the pages of the external job. However, even in the case where the external job is not a job to be printed quickly, the user who instructed the scanning job always has to wait.

Japanese Unexamined Laid-open Patent Publication No. 10-278388 discloses that a next job will be outputted by priority in cases where the next job is inputted during the standby status of a confirmation print.

Furthermore, Japanese Unexamined Laid-open Patent Publication No. 8-44515 discloses that a job with a small amount of data is outputted by priority.

In the technique disclosed in the aforementioned documents, however, since such next job or job with small amount of data will be always executed by priority, in cases where an earlier inputted external job is required to be executed before the execution of the next job or an external job is not required to be executed by priority even if the data amount of the external job is smaller than that of the scanning job, the technique cannot cope with such cases. Therefore, the operationality was not good.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

It is an object of the present invention to provide a data processing apparatus with improved operationality in which, in cases where a request to execute processing of an external job transmitted from the outside by a compressing means or an expanding means and a request to execute processing of data of the scanning job by the compressing means or the expanding means overlap, appropriate processing is performed depending on the circumstances of both jobs.

It is another object of the present invention to provide a data processing method with improved operationality in which, in cases where a request to execute processing of an external job transmitted from the outside by a compressing means or an expanding means and a request to execute processing of data of the scanning job by the compressing means or the expanding means overlap, appropriate processing is performed depending on the circumstances of both jobs.

According to a first aspect of the present invention, a data processing apparatus, includes an image reader for reading an original, a receiver capable of receiving an external job transmitted from an outside, a transmitter capable of transmitting image data of the original read by said image reader as a scanning job to an outside, a print device for printing data of the external job received by said receiver, one or a plurality of compressing/expanding devices for compressing the image data of the scanning job or the data of the external job and expanding the compressed data, and a controller for controlling execution of processing the external job and the scanning job by said compressing/expanding devices in accordance with execution status of the external job in cases where a request for processing the data of the external job by said compressing/expanding devices and a request for processing the data of the scanning job by said compressing/expanding devices overlap.

According to a second aspect of the present invention, a data processing method, comprising the steps of: reading an original by an image reader; receiving an external job transmitted from an outside; transmitting image data of the original read by the image reader to an outside as a scanning job; printing received data of the external job; and controlling execution of processing of the external job and the scanning job by the compressing/expanding devices in accordance with execution status of the external job in cases where a request for processing the data of the external job by one or a plurality of compressing/expanding devices and a request for processing the data of the scanning job by said compressing/expanding devices overlap.

According to a third aspect of the present invention, a data processing apparatus includes an image reader for reading an original, a receiver capable of receiving an external job transmitted from an outside, a transmitter capable of transmitting image data of the original read by said image reader as a scanning job to an outside, a compressing/expanding device for compressing data and expanding the compressed data, and a controller for controlling execution of processing of the external job and the scanning job by said compressing/expanding devices in accordance with execution status of the external job in cases where a request for processing the data of the external job by said compressing/expanding devices and a request for processing the data of the scanning job by said compressing/expanding devices overlap.

Other objects and the features will be apparent from the following detailed description of the present invention with reference to the attached drawings.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspects or features of other embodiments where applicable. The descriptions of aspects, features and/or advantages of particular embodiments should not be construed as limiting other embodiments or the claims.

BRIEF DESCRIPTION OF THE DRAWINGS

The accompanying figures are provided by way of example, without limiting the broad scope of the invention or various other embodiments, wherein.

DETAILED DESCRIPTION OF THE PREFERRED EMBODIMENTS

Figure 1:
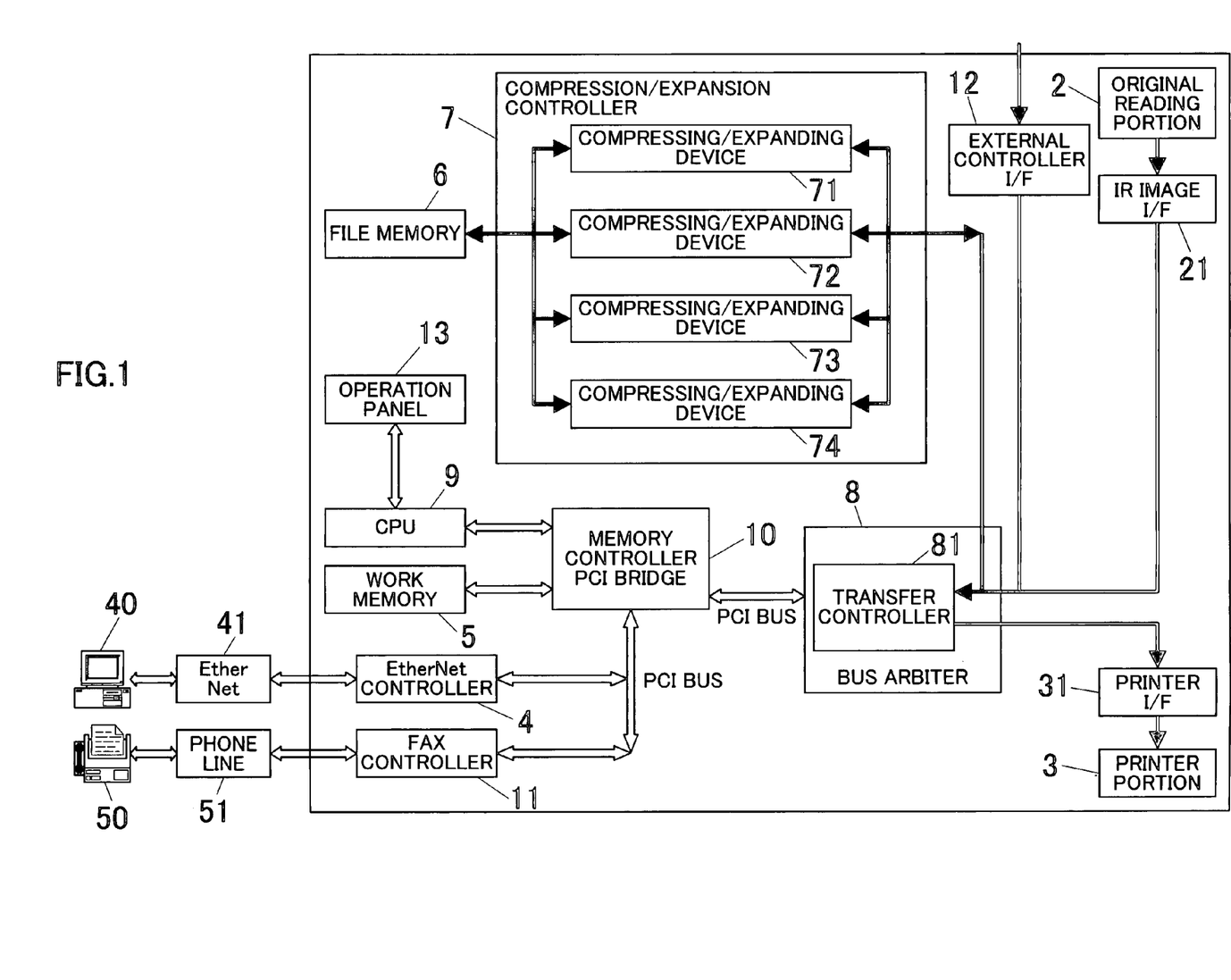
FIG. 1 is a block diagram showing the structure of a data processing apparatus according to an embodiment of the present invention.

FIG. 1 shows a block diagram of a MFP1 as a data processing apparatus according to an embodiment of the present invention.

This data processing apparatus is provided with a plurality of input means and a plurality of output means. In detail, this apparatus is provided with an original reading portion 2 as an input means, an external controller interface 12 (external controller I/F in FIG. 1) as an input means, a printer portion 3 as an output means (printing means), an EtherNet controller 4 which functions as both an input means and an output means, and a FAX controller 11 which functions as both an input means and an output means.

The original reading portion 2 is provided with a scanner for reading out an original, and the image data read out from the original is sent to a bus arbiter 8 via a read-image interface 21 (IR IMAGE I/F in FIG. 1).

The external controller Interface 12 receives a print job from an external printer controller (not shown). The printer portion 3 prints the image data transferred from the bus arbiter 8 on a paper or the like.

The EtherNet controller 4 receives/transmits a job via an EtherNet 41. For example, the EtherNet controller 4 receives a print job or an internet FAX job transmitted from external devices 40 such as a user personal computer or an internet FAX device via the Ethernet 41, or transmits image data of an original read with the original reading portion 2 to the external devices 40 via the EtherNet 41.

The FAX controller 11 receives/transmits a FAX job between an external FAX device 50 and the MFP1 via a phone line 51. For example, the FAX controller 11 receives a FAX job transmitted from the external FAX device 50 via the phone line 51 or faxes the original image data read by the original reading portion 2 to the external FAX device 50 via the phone line 51.

The MFP1 is further provided with a work memory 5, a file memory 6, a compression/expansion controller 7, the aforementioned bus arbiter 8, a CPU 9, a memory controller PCI bridge 10 and an operation panel 13.

The work memory 5 develops data-to-be-outputted such as the data contained in the job received by the EtherNet controller 4 or the external controller I/F 12, the data contained in the FAX receive job received by the FAX controller 11 and the image data read by the original reading portion 2, and stores another data.

The compression/expansion controller 7 of this embodiment is provided with a total of four compressing/expanding devices (compressors/expanders) 71 to 74 connected in parallel with each other and controls these compressing/expanding devices 71 to 74 so that the compression and expansion of the data-to-be-outputted is performed by the compressing/expanding devices 71 to 74. Each of the compressing/expanding devices 71 to 74 can perform a compressing operation or an expanding operation selectively.

The file memory 6 stores the data-to-be-outputted compressed by the compressing/expanding devices 71 to 74.

The bus arbiter 8 transfers the data-to-be-outputted to each portion in the MFP by a transfer controller 81.

The memory controller PCI bridge 10 controls the input and output status to the work memory 5 and connects the CPU bus and the PCI bus.

The CPU 9 controls the entire MFP 1 including the memory controller PCI bridge 10, the transfer controller 81, the compression/expansion controller 7. For example, the CPU 9 controls the operation of the compressing/expanding devices 71 to 74 via the compression/expansion controller 7. The CPU 9 has another various functions. For example, the CPU 9 has a function of discriminating whether there is a request to compress or expand external job data transmitted from the outside or scanning job data. The CPU 9 has another functions such as a function of discriminating the type of the job, a function of discriminating whether the external job is a "first-set-print job," whether the external job is a "confidential print job" or whether the print (printing) of the external job is the first set of print or second set of print and a function of counting the number of pages of the job executed by the compressing/expanding devices 71 to 74.

In this specification, the "scanning job" denotes a job that transmits image data of an original read by the original reading portion 2. The "first-set-print job" denotes a job in which a first set among plural sets is initially printed and then the remaining sets are printable or the job is deletable based on a certain instruction. The "confidential print job" denotes a print job in which print processing is initiated only when a print requester gives a print instruction to the MFP1 and then inputs the print requester's ID code and/or password via the operational panel 13 of the MFP1, which is different from a normal print mode in which print processing is initiated immediately after the print instruction to the MFP1 by a print requester.

The operation panel 13 is used to perform various operations, and is provided with scan job mode setting keys, a scan start key, ten keys for inputting the ID code and/or password required for the confidential print job, various touch keys, a display portion, etc.

Executable jobs of the MFP1 shown in FIG. 1 include a copy job, a scan job, an internal printer job (including an internet FAX receive job), an external controller print job, a FAX transmission job and a FAX receive job. Among these jobs, as the external jobs which are transmitted from the outside, there are an internal printer job, an external controller print job and a FAX receive job. As for the data flow of each job, there are a data input and a data output.

The data flow of each job will be explained as follows.

[Data Input]

As for a copy job, a scan job and a FAX transmission job, the image read by the original reading portion 2 is transferred to the work memory 5 via the read-image interface 21 and then to the compressing/expanding devices 71 to 74 to be compressed, and then stored in the file memory 6.

As for an internal printer job, the print data transmitted from the external device 40 such as a personal computer or an internet FAX apparatus via the EtherNet 41 is received by the EtherNet controller 4 and developed in the work memory 5, then transferred to the compressing/expanding devices 71 to 74 to be compressed, and then stored in the file memory 6.

As for a FAX receive job, the image data transmitted from the external FAX apparatus 50 via the phone line 51 is received by the FAX controller 11, transferred to the work memory 5, transferred to the compressing/expanding devices 71 to 74 to be compressed, and then stored in the file memory 6.

As for an external controller print job, the print data transmitted from the external controller is received by the external controller interface 12, transferred to the work memory 5 and then to the compressing/expanding devices 71 to 74 to be compressed, and then stored in the file memory 6.

[Data Output]

As for a copy job, an internal printer job, an external controller print job and a FAX receive job, the compressed data read out of the file memory 6 is expanded by the compressing/expanding devices 71 to 74 and transferred to the printer portion 3 via the work memory 5 and the printer interface 31 to be printed.

As for a scanning job, the compressed data read out of the file memory 6 is expanded by the compressing/expanding devices 71 to 74, transferred to the EtherNet controller 4 via the work memory 5 and then transmitted to the external device 40 via the EtherNet 41.

As for a FAX transmission job, the compressed data read out of the file memory 6 is expanded by the compressing/expanding devices 71 to 74, transferred to the FAX controller 11 via the work memory 5 and then transmitted to the external FAX device 50 via the phone line 51.

In the MFP1 shown in FIG. 1, the contents of processing for switching the compressing/expanding devices to be performed by the CPU 9 when a request of an external job to be processed by the compressing/expanding devices 71 to 74 and a request of a scanning job to be processed by the compressing/expanding devices 70 to 74 overlap are explained with reference to the flowchart shown in FIG. 2. In the following explanation, the external job will be referred to as a "print job."

It is assumed that this processing will be called every time when a certain job activates the compressing/expanding processing or when processing by the compressing/expanding devices 71 to 74 is completed.

First, at S101, the CPU 9 discriminates whether there is a compression request or an expansion request. If there is no request (No at S101), the processing is terminated. If there is a request (Yes at S101), the routine proceeds to S102 to discriminate whether all of the compressing/expanding devices 71 to 74 are currently being used (i.e., busy).

At S102, if all of the compressing/expanding devices are busy (Yes at S102), since the switching is impossible, the routine terminates to hold the processing until the completion of the current processing by the compressing/expanding devices 71 to 74.

At S102, if all of them are not busy (No at S102), a subroutine for a switching discrimination processing is called at S103. As a result of discrimination in this subroutine considering various conditions, if it is discriminated that the compressing/expanding devices 71 to 74 can be used for a requested job, a switching request flag is set and returned. This subroutine will be detailed later.

Next, at S104, it is discriminated from the output at the subroutine of S103 whether a switching request flag is set. If the flag is set (Yes at S104), switching processing to the requested job is performed at S105. If the switching request flag is not set (No at S104), the routine terminates to hold the switching to the requested job.

Figure 2:
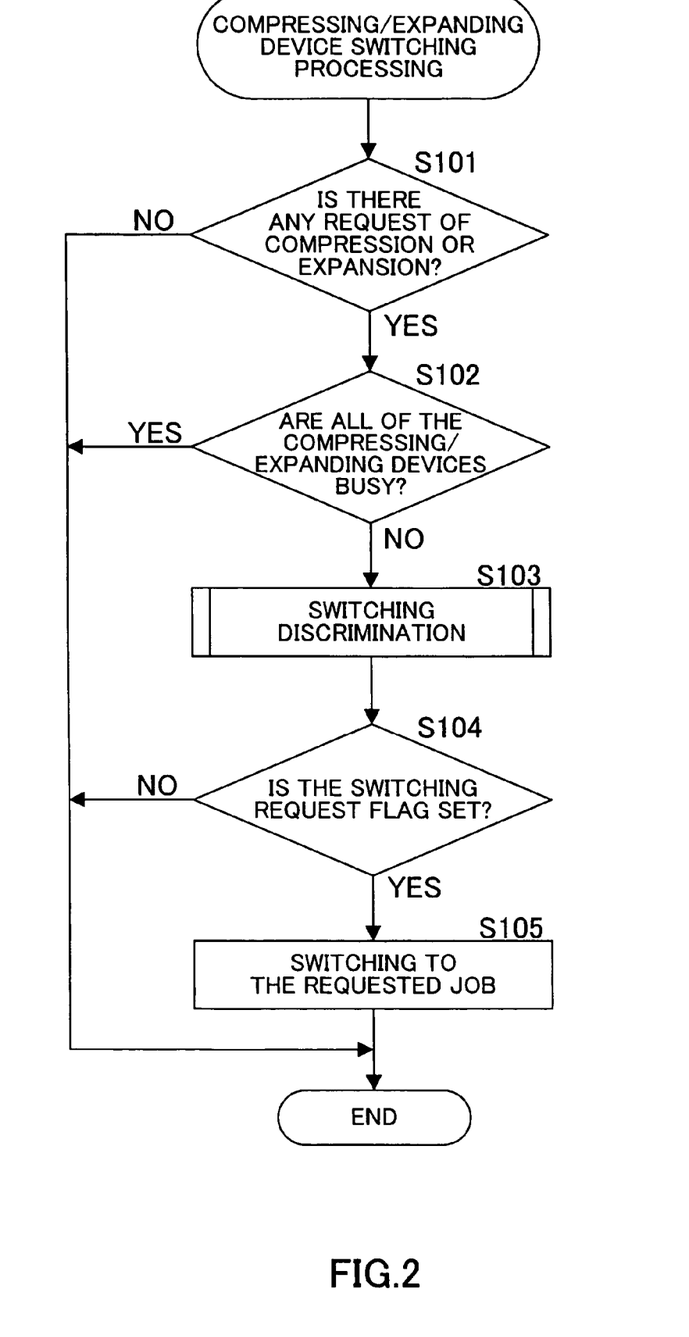
FIG. 2 is a flowchart showing the contents of the switching processing of the compressing/expanding devices in the data processing apparatus shown in FIG. 1.
Figure 3:
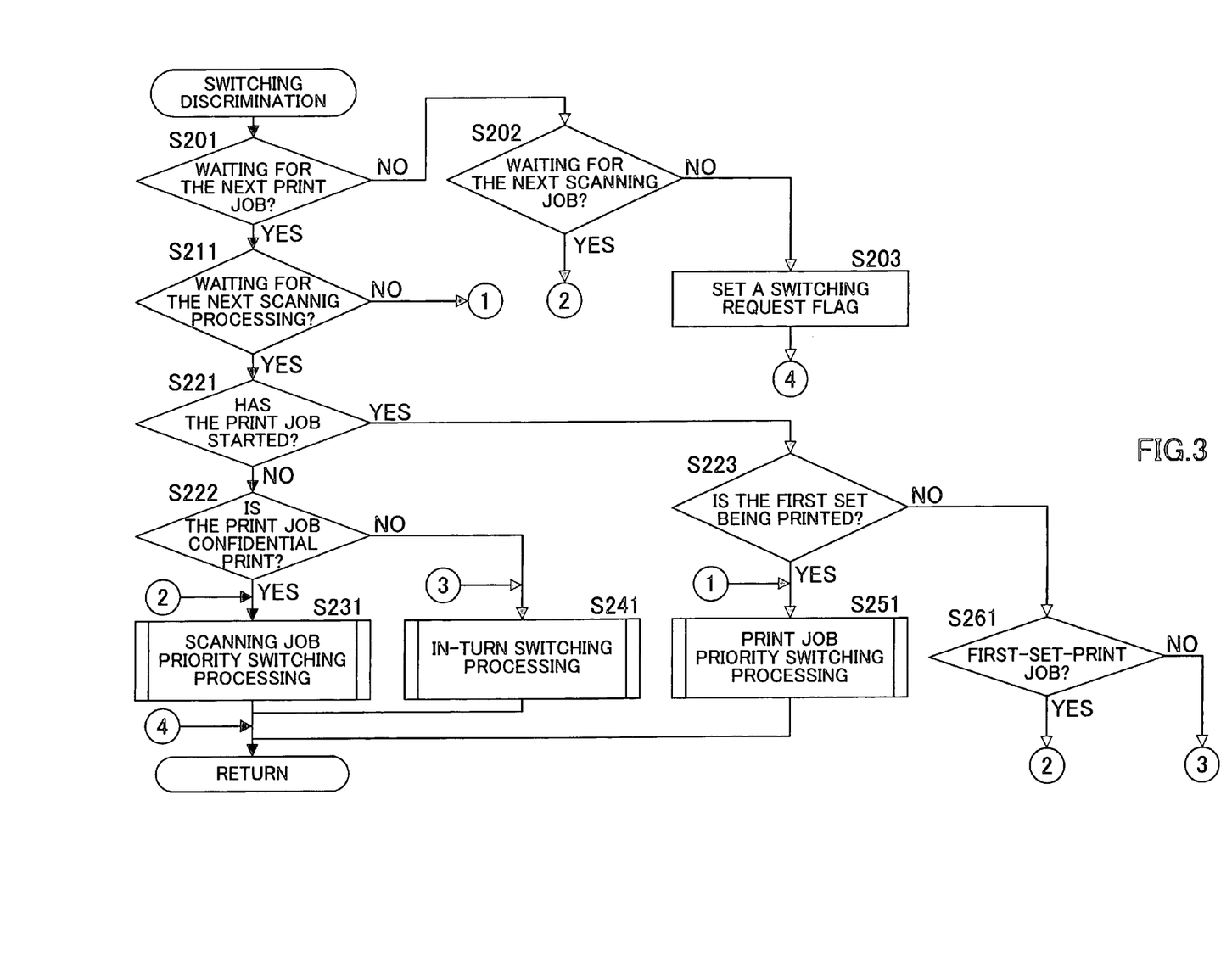
FIG. 3 is a flowchart showing the contents of the switching discrimination processing of S103 in the flowchart shown in FIG. 2.

The contents of the subroutine of the switching discrimination processing of S103 in FIG. 2 are shown in the flowchart in FIG. 3.

In FIG. 3, at S201, it is discriminated whether the print job which is being currently executed is in a waiting status as a next job (hereinafter, "next print job processing waiting status"). If it is in the next print job processing waiting status (Yes at S201), at S211, it is discriminated whether a scanning job is in a waiting status as a next job (hereinafter, "next scanning job processing waiting status").

If it is in the next scanning job processing waiting status (Yes at S211), in other words, if both of the print job and the scanning job are in a waiting status, the routine proceeds to S221 to perform a multi-access control.

At S201, if it is not in the next print job processing waiting status (No at S201), it is discriminated whether it is in the next scanning job processing waiting status at S202. If it is in the next scanning job processing waiting status (Yes at S202), the subroutine of the scanning job priority switching processing (S231) (which will be detailed later) is called. If it is not in the scanning job processing waiting status at S202 (No at S202), since a compression or expansion request is generated in a state in which a new job is activated when no job is currently in an operation status, the switching flag is set without condition at S203 and the routine returns.

At S211, if it is not in the next scanning job processing waiting status (No at S211), the subroutine of the print job priority switching processing of S251 is called.

Hereinafter, the aforementioned multi-access control of the print job and the scanning job is detailed.

At S221, it is discriminated whether the printer portion 3 has already started the print job. If it has not started yet (No at S221), the routine proceeds to S222 to discriminate whether the print job is a confidential print. If it is a confidential print (Yes at S222), it is not necessary to quickly execute the confidential print job because it is impossible to initiate the print job until the user inputs his/her ID code and/or password using the operation panel 13 after finishing inputting of the print job data. Accordingly, the routine proceeds to S231 to call the subroutine of the scanning job priority switching processing.

If the print job is not a confidential print job (No at S222), the routine proceeds to S241 to call the subroutine of the in-turn switching processing.

On the other hand, if the print job has already started at S221 (Yes at S221), the routine proceeds to S223 and it is discriminated whether the first set is being printing. If the first set is being printed (Yes at S223), the subroutine of the print job priority switching processing is called at S251 because the user of the print job wishes to obtain the print outputs as soon as possible.

At S223, if the first set is not currently being printed (No at S223), at S261, it is discriminated whether it is a first-set-print job. If it is the first-set-print job (Yes at S261), the routine proceeds to the scanning job priority switching processing of S231 because it is not necessary to quickly print the second set and the subsequent sets. If it is not a first-set-print job (No at S261), the routine proceeds to the in-turn switching processing of S241.

As will be understood from the above explanation, in cases where a processing request of an external job and that of a scanning job overlap, (1) when the external job is printing the first set, the processing of the external job will be executed by priority (2) when the external job is a confidential print job which has not started yet or when the external job is a second set or subsequent set thereof of a first-set-print job, the scanning job will be executed by priority, (3) in cases other than the above, both processing will be executed in turn. Accordingly, appropriate control in compliance with the actual situation can be performed, resulting in improved operationality.

Figure 4A:
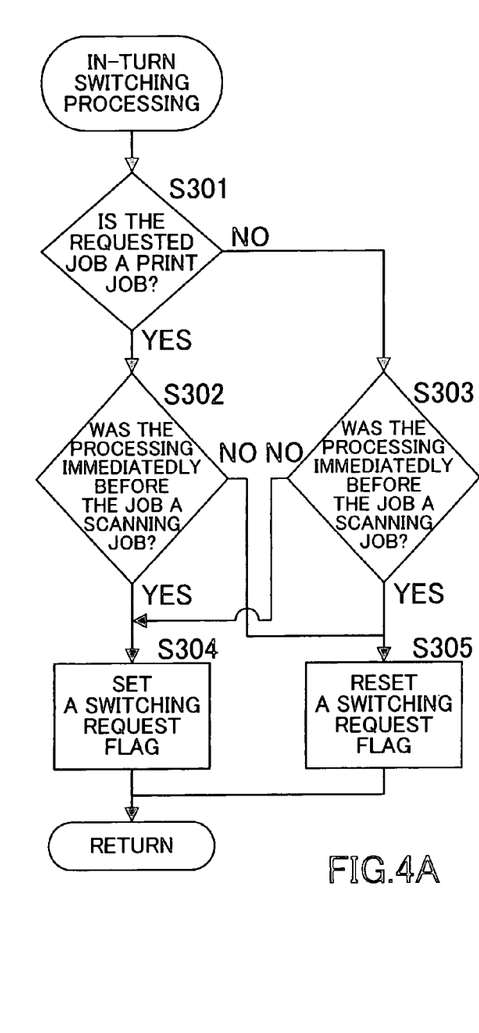
FIGS. 4A to 4C are flowcharts showing the contents of the in-turn switching processing of S241, the print-job-priority switching processing of S251 and the scanning job priority switching processing of S231 in the flowchart shown in FIG. 3.
Figure 4B:
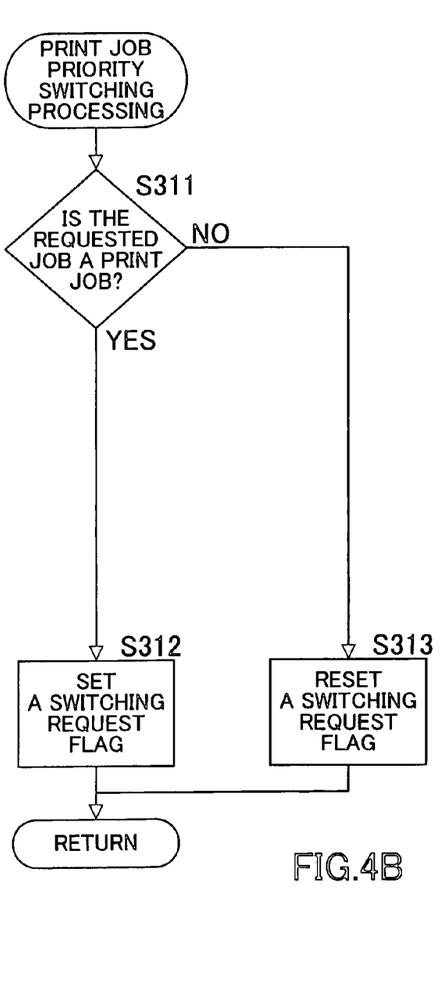
Figure 4C:
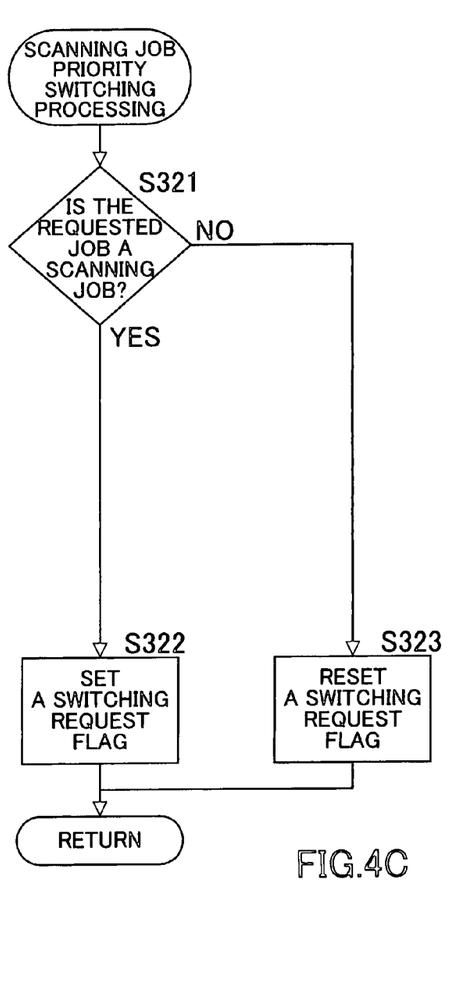

The flowchart of the subroutine of the aforementioned in-turn switching processing (S241), that of the print job priority switching processing (S251) and that of the scanning job priority switching processing (S231) shown in FIG. 3 are shown in FIG. 4A, FIGS. 4B, and 4C, respectively.

In the in-turn switching processing shown in FIG. 4A, the processing of the print job and that of the scanning job are executed in turn. Therefore, first, at S301, it is discriminated whether the requested job is a print job. If it is a print job (Yes at S301), at S302, it is discriminated whether the processing immediately before the job was processing of compressing or expanding a scanning job. If it was the processing of a scanning job (Yes at S302), the routine proceeds to S304 to switch the processing from a scanning job to a print job, and a switching request flag is set.

At S302, if it was not processing of a scanning job (No at S302), since the processing immediately before the processing of a print job was also processing of a print job, the next processing should be processing of a scanning job. Therefore, the switching flag is reset at S305.

At S301, if the requested job is not a print job, in other words, if the requested job is a scanning job (No at S301), at S303, it is discriminated whether the processing immediately before the processing of the scanning job was processing of compressing or expanding a scanning job. If it was not compressing of scanning job (No at S303), the routine proceeds to S304 to switch the processing from the print job to a scanning job. Then, a switching request flag is set.

At S303, if it was processing of a scanning job (Yes at S303), since the processing immediately before the current processing was also processing of a scanning job, the next processing should be processing of a print job. Therefore, at S305, a switching flag is reset.

In the print job priority switching processing shown in FIG. 4B, at S311, it is discriminated whether the requested job is a print job. If it is a print job (Yes at S311), at S312, a switching request flag is set. If it is not a print job (No at S311), at S313, a switching request flag is reset.

In other words, in this print job priority switching processing, a switching request flag is set only when the requested job is a print job and reset when it is not a print job, so that only a request for compressing or expanding a print job is accepted to thereby preferentially execute the processing of the print job.

In the scanning job priority switching processing shown in FIG. 4C, at S321, it is discriminated whether the requested job is a scanning job. If it is a scanning job (Yes at S321), at S322, a switching request flag is set. If it is not a scanning job (No at S321), at S323, a switching request flag is reset.

In other words, in this scanning job priority switching processing, a switching request flag is set only when the requested job is a scanning job and reset when it is not a scanning job, so that only a request for compressing or expanding a scanning job is accepted to thereby preferentially execute the processing of the scanning job.

Figure 5:
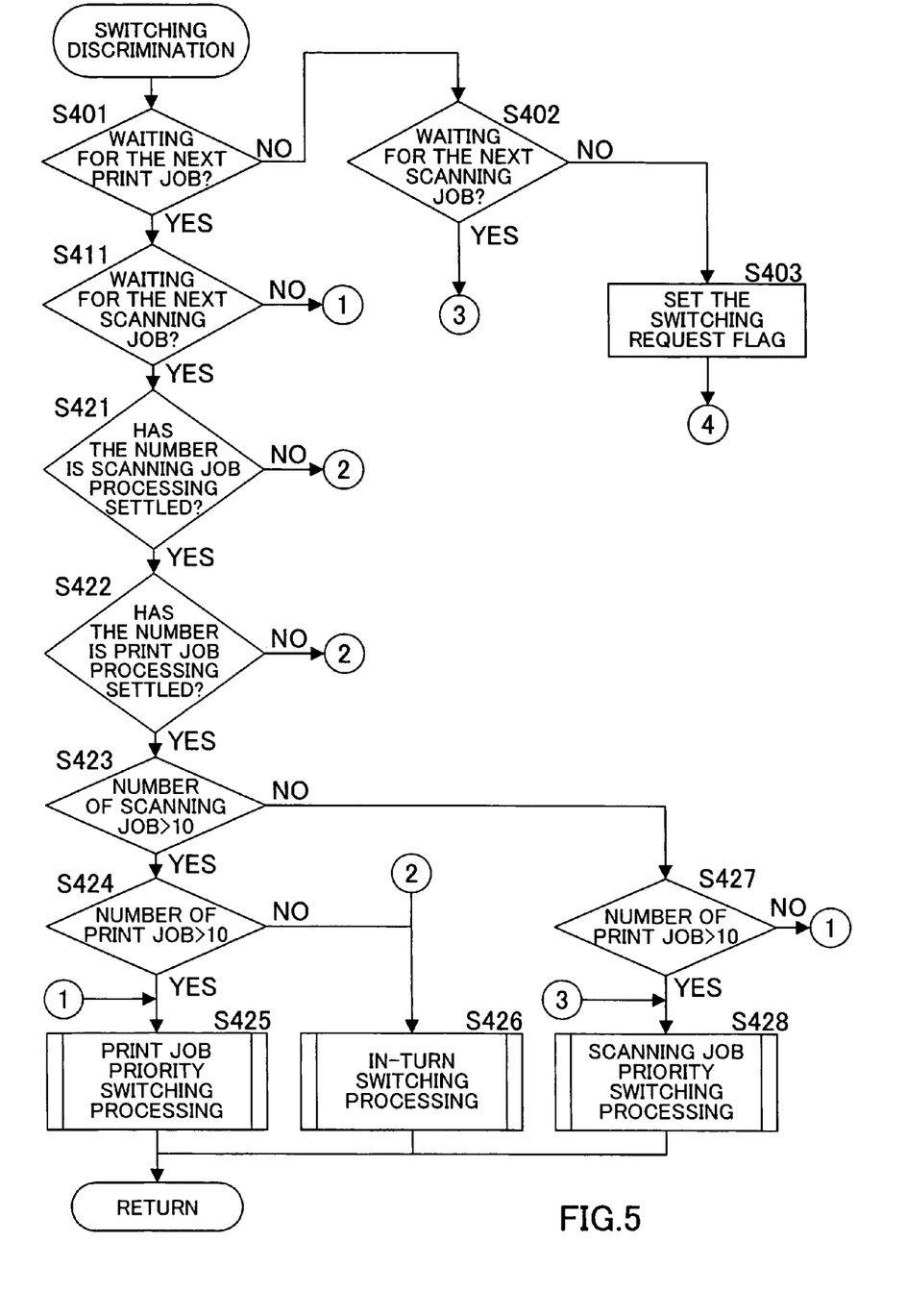
FIG. 5 is a flowchart showing another example of the switching discrimination processing of S103 in the flowchart shown in FIG. 2.

FIG. 5 shows a flowchart showing another embodiment of the switching discrimination processing (S103 in FIG. 2) shown in FIG. 3.

In this embodiment, processing by the compressing/expanding devices 71 to 74 is switched in accordance with the number of pages of a print job processed by the compressing/expanding devices.

First, at S401, it is discriminated whether a next print job is in a waiting status. If the next print job is in a waiting status (Yes at S401), at S411, it is discriminated whether a next scanning job is in a waiting status.

If the next scanning job is in a waiting status (Yes at S411), in other words, since both jobs are in a waiting status, the routine proceeds to S421 to perform a multi-access control of the print job and the scanning job.

At S401, if the next print job is not in a waiting status (No at S401), it is discriminated whether a next scanning job processing is in a waiting status at S402. If the next scanning job is in a waiting status (Yes at S402), the subroutine of the scanning job priority switching processing (S428) is called. If the next scanning job is not in a waiting status at S402 (No at S402), since a compression or expansion request is generated in a state in which a new job is activated when no job is currently in an operation status, a switching flag is set without condition at S403 and the routine returns.

At S411, if a next scanning job is not in a waiting status (No at S411), the subroutine of the print job priority switching processing of S425 is called.

Hereinafter, the multi-access control in accordance with the processed pages of the print job and the scanning job, which is shown at S421 and subsequent thereto, is detailed.

At S421 and S422, it is discriminated whether the number of pages of a scanning job to be processed and the number of pages of a print job to be processed are both settled. If at least one of them is not settled (No at S421 or No at S422), the routine proceeds to S426 to call the subroutine of the in-turn switching processing.

If both of them are settled (Yes at S421 and Yes at S422), it is discriminated whether the respective number of pages of the scanning job and the print job to be processed exceeds 10 pages. Based on the discrimination result, it is decided which job is processed by priority or whether the in-turn switching processing is employed.

(1) In the case where the number of pages of a scanning job to be processed>10 (Yes at S423) and the number of pages of a print job to be processed>10 (Yes at S424)

In this case, since the print job should be processed by priority, the routine proceeds to S425 to call the subroutine of the print job priority switching processing.

(2) In the case where the number of pages of a scanning job to be processed>10 (Yes at S423) and the number of pages of a print job to be processed≦10 (Yes at S424)

In this case, since it is necessary to switch the print job and the scanning job in turn, the routine proceeds to S426 to call the subroutine of the in-turn switching processing.

(3) In the case where the number of pages of a scanning job to be processed≦10 (No at S423) and the number of pages of a print job to be processed>10 (Yes at S427)

In this case, since it is necessary to execute the scanning job by priority, the routine proceeds to S428 to call the subroutine of the scanning job priority switching processing.

(4) In the case where the number of pages of a scanning job to be processed≦10 (No at S423) and the number of pages of a print job to be processed≦10 (Yes at S427)

In this case, since it is necessary to execute the print job by priority, the routine proceeds to S425 to call the subroutine of the print job priority switching processing.

Since the subroutine of each switching processing is the same as that shown in FIG. 4, the explanation is omitted.

In the embodiment shown in FIG. 5, although the aforementioned discrimination was made based on whether the number of pages to be processed is larger than or smaller than 10, the number of pages can be arbitrarily changed. Furthermore, depending on the environment of MFP1, the priority of print job or that of scanning job can be switched in accordance with a user setting. Furthermore, in the aforementioned embodiment, although the switching is performed by considering not only the number of pages of the print job to be performed but also the number of pages of the scanning job to be performed, it is possible to eliminate the consideration of the number of pages of the scanning job to be performed. However, the consideration of the number of pages of the scanning job enables the minute controls matching with the user's intention.

In the aforementioned embodiment, although the print job and the scanning job by the compressing/expanding devices 71 to 74 are performed in parallel by switching the processing by the compressing/expanding devices, these jobs can be simultaneously performed in parallel by changing the assignment of the four compressing/expanding devices 71 to 74.

Figure 6A:
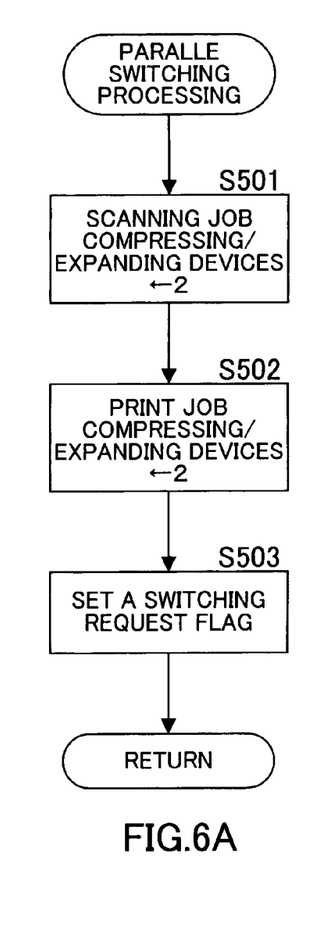
FIGS. 6A to 6C are flowcharts showing another example of parallel processing of a print job and a scanning job.
Figure 6B:
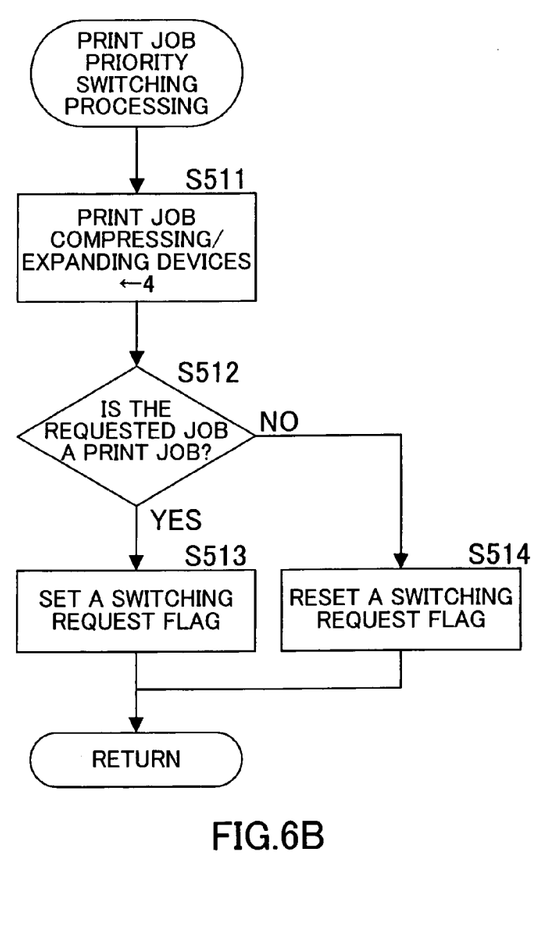
Figure 6C:
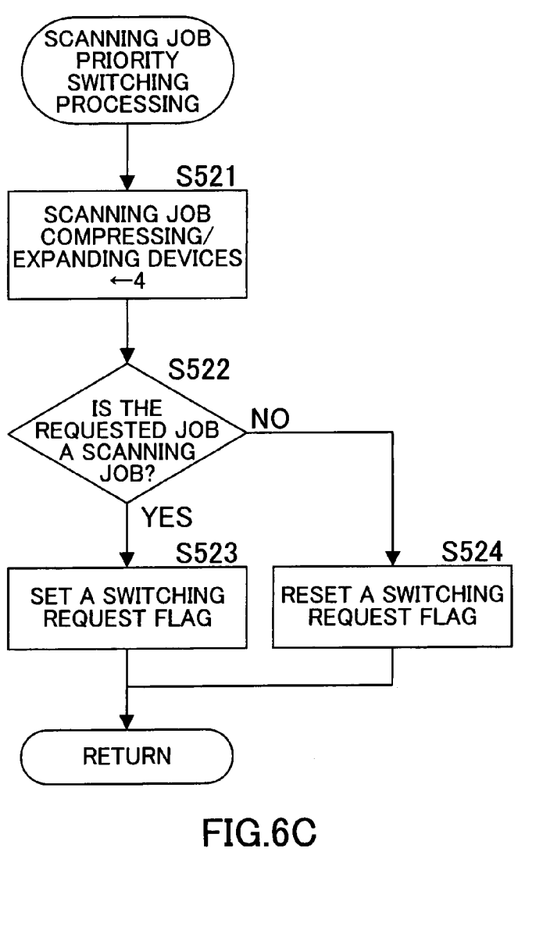

FIGS. 6A to 6C show such parallel processing. FIG. 6A is a flowchart showing the subroutine of the parallel switching processing, FIG. 6B is a flowchart showing the subroutine of the print job priority switching processing, and FIG. 6C is a flowchart showing the subroutine of the scanning job priority switching processing.

The parallel switching processing shown in FIG. 6A corresponds to the in-turn switching processing of S241 shown in FIG. 3, the print job priority switching processing shown in FIG. 6B corresponds to the print job priority switching processing of S251 shown in FIG. 3, and the scanning job priority switching processing shown in FIG. 6C corresponds to the scanning job priority switching processing of S231 shown in FIG. 3.

In the parallel switching processing shown in FIG. 6A, two compressing/expanding devices among a total of four compressing/expanding devices 71 to 74 are assigned to the print job and the scanning job, respectively. First, at S501, two compressing/expanding devices are assigned to the scanning job. Furthermore, at S502, two compressing/expanding devices are assigned to the print job. Then, at S503, a switching request flag is set. By this switching request, in the switching processing to the requested job of S105 shown in FIG. 2, the requests for these two jobs are activated simultaneously.

On the other hand, in the print job priority switching processing shown in FIG. 6B, at S511, four compressing/expanding devices are assigned to the print job. At S512, it is discriminated whether the requested job is a print job. If it is a print job (Yes at S512), at S513, a switching request flag is set. If it is not a print job (No at S512), a switching request flag is reset.

In other words, a switching request flag is set only when the requested job is a print job and reset when the request job is not a print job, so that only a request for compressing or expanding a print job is accepted to preferentially execute the print job.

Furthermore, in the scanning job priority switching processing shown in FIG. 6C, at S521, four compressing/expanding devices are assigned to the scanning job. At S522, it is discriminated whether the requested job is a scanning job. If it is a scanning job (Yes at S522), at S523, a switching request flag is set. If it is not a scanning job (No at S522), a switching request flag is reset.

In other words, a switching request flag is set only when the requested job is a scanning job and reset when the request job is not a scanning job, so that only a request for compressing or expanding a scanning job is accepted to preferentially execute the scanning job.

In cases where it is initialized at the time of turning on a power and where there exist only one request to execute a scanning job or a print job, all of the four compressing/expanding devices are assigned to the scanning job and the print job, respectively.

In the aforementioned embodiment, in order to perform the processing of the scanning job and that of the print job in parallel, two compressing/expanding devices are assigned to each job. However, only one device can be assigned to each job, or the assignment number of the devices to each job can be changed.

While illustrative embodiments of the present invention have been described herein, the present invention is not limited to the various preferred embodiments described herein, but includes any and all embodiments having modifications, omissions, combinations (e.g., of aspects across various embodiments), adaptations and/or alterations as would be appreciated by those in the art based on the present disclosure. The limitations in the claims are to be interpreted broadly based the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

What is claimed is:

1. A data processing apparatus, comprising:
an image reader for reading an original;
a receiver capable of receiving an external job transmitted from an outside source;

a transmitter capable of performing a first process on image data of the original read by said image reader as a scanning job by transmitting the image data to an outside device;

a print device for performing a second process on printing data of the external job received by said receiver by printing the printing data;

one or a plurality of compressing/expanding devices for compressing the image data of the scanning job or the data of the external job and expanding the compressed data; and a controller for controlling execution of processing the external job for the second process by the print device and the scanning job for the first process by the transmitter by said one or the plurality of compressing/expanding devices, wherein an ordering of priority of the external job and the scanning job is determined in accordance with execution status indicating whether the external job is a confidential print job, and the execution of processing the external job and the scanning job is controlled in accordance with the determined ordering priority in cases where a request for processing the data of the external job by said one or the plurality of compressing/expanding devices and a request for processing the data of the scanning job by said one or the plurality of compressing/expanding devices overlap.

2. A data processing apparatus, comprising:

an image reader for reading an original;

a receiver capable of receiving an external job transmitted from an outside source;

a transmitter capable of performing a first process on image data of the original read by said image reader as a scanning job by transmitting the image data to an outside device;

a print device for performing a second process on printing data of the external job received by said receiver by printing the printing data;

one or a plurality of compressing/expanding devices for compressing the image data of the scanning job or the data of the external job and expanding the compressed data; and a controller for controlling execution of processing the external job and the scanning job by said one or the plurality of compressing/expanding devices, wherein an ordering of priority of the external job and the scanning job is determined in accordance with execution status indicating whether said print device is printing a first set among plural sets of the external job, and the execution of processing the external job and the scanning job is controlled in accordance with the determined ordering priority in cases where a request for processing the data of the external job by said one or the plurality of compressing/expanding devices and a request for processing the data of the scanning job by said one or the plurality of compressing/expanding devices overlap;

wherein said controller makes said one or the plurality of compressing/expanding devices hold processing of the scanning job by said one or the plurality of compressing/expanding devices when said print device is printing the first set of the external job, and makes said one or the plurality of compressing/expanding devices execute processing of the external job and the scanning job by said one or the plurality of compressing/expanding devices in parallel when said print device is printing a second set of the external job or subsequent set thereof.

3. The data processing apparatus as recited in claim 2, wherein said controller makes said one or the plurality of compressing/expanding devices execute processing of the external job and that of the scanning job by said one or the plurality of compressing/expanding devices in parallel by switching the processing of the external job and that of the scanning job in turn.

4. The data processing apparatus as recited in claim 2, wherein said controller assigns at least one of said compressing/expanding devices to the processing of the external job and that of the scanning job, respectively, to thereby execute the first process and the second process in parallel.

5. A data processing apparatus, comprising:

an image reader for reading an original;

a receiver capable of receiving an external job transmitted from an outside source;

a transmitter capable of performing a first process on image data of the original read by said image reader as a scanning job by transmitting the image data to an outside device;

a print device for performing a second process on printing data of the external job received by said receiver by printing the printing data;

one or a plurality of compressing/expanding devices for compressing the image data of the scanning job or the data of the external job and expanding the compressed data; and a controller for controlling execution of processing the external job and the scanning job by said one or the plurality of compressing/expanding devices, wherein an ordering of priority of the external job and the scanning job is determined in accordance with execution status indicating whether the external job is a first-set-print job, and the execution of processing the external job and the scanning job is controlled in accordance with the determined ordering priority in cases where a request for processing the data of the external job by said one or the plurality of compressing/expanding devices and a request for processing the data of the scanning job by said one or the plurality of compressing/expanding devices overlap;

wherein the first-set-print job comprises a job in which a first set among plural sets is initially printed and print for the remaining sets is standing by;

wherein, in cases where the external job is a first-set-print job, said controller makes said one or the plurality of compressing/expanding devices hold processing of the scanning job by said one or the plurality of compressing/expanding devices when said print device is printing a first set of plural sets of the external job, and execute processing of the scanning job by said one or the plurality of compressing/expanding devices when the printing of the first set is completed.

6. The data processing apparatus as recited in claim 1, wherein, in cases where the external job is a confidential print job, said controller makes said one or the plurality of compressing/expanding devices execute processing of the scanning job by said one or the plurality of compressing/expanding devices if printing of the external job has not started yet.

7. The data processing apparatus as recited in claim 6, wherein, in cases where said print device is printing the external job, said controller makes said one or the plurality of compressing/expanding devices execute processing of the scanning job by said one or the plurality of compressing/expanding devices after a completion of the printing of the external job.

8. The data processing apparatus as recited in claim 1, wherein said controller changes a processing style of the external job and that of the scanning job by said one or the plurality of compressing/expanding devices depending on processing amount of the external job by said one or the plurality of compressing/expanding devices.

9. The data processing apparatus as recited in claim 8, wherein said controller further changes a processing style of the external job and that of the scanning job by said one or the plurality of compressing/expanding devices depending on processing amount of the scanning job by said one or the plurality of compressing/expanding devices.

10. A data processing method, comprising the steps of:
reading an original by an image reader;
receiving an external job transmitted from an outside source;
transmitting image data of the original read by the image reader to an outside device as a scanning job;
printing received data of the external job; and
controlling execution of processing of the external job for the step of printing and the scanning job for the step of transmitting by one or a plurality of compressing/expanding devices, wherein an ordering of priority of the external job and the scanning job is determined in accordance with execution status indicating whether the external job is a first-set-print job, or whether the external job is a confidential print job, and the execution of processing the external job and the scanning job is controlled in accordance with the determined ordering priority in cases where a request for processing the data of the external job by the one or the plurality of compressing/expanding devices and a request for processing the data of the scanning job by said one or the plurality of compressing/expanding devices overlap;
wherein the first-set-print job comprises a job in which a first set among plural sets is initially printed and remaining sets are printable or deletable based on an instruction.

11. A data processing apparatus, comprising:
an image reader for reading an original;
a receiver capable of receiving an external job transmitted from an outside source;
a transmitter capable of transmitting image data of the original read by said image reader as a scanning job to an outside device;
a print device for printing data of the external job received by said receiver;
a compressing/expanding device for compressing data and expanding the compressed data; and
a controller for controlling execution of processing of the external job for printing by the print device and the scanning job for transmitting by the transmitter by said compressing/expanding device, wherein an ordering of priority of the external job and the scanning job is determined in accordance with execution status indicating whether the external job is a confidential print job, and the execution of processing the external job and the scanning job is controlled in accordance with the determined ordering priority in cases where a request for processing the data of the external job by said compressing/expanding device and a request for processing the data of the scanning job by said compressing/expanding device overlap.

12. A data processing apparatus, comprising:
an image reader for reading an original;
a receiver capable of receiving an external job transmitted from an outside source;
a transmitter capable of transmitting image data of the original read by said image reader as a scanning job to an outside device;
a print device for printing data of the external job received by said receiver;
a compressing/expanding device for compressing data and expanding the compressed data; and
a controller for controlling execution of processing of the external job and the scanning job by said compressing/expanding device, wherein an ordering of priority of the external job and the scanning job is determined in accordance with execution status indicating whether said print device is printing a first set of the external job, and the execution of processing the external job and the scanning job is controlled in accordance with the determined ordering priority in cases where a request for processing the data of the external job by said compressing/expanding device and a request for processing the data of the scanning job by said compressing/expanding device overlap;
wherein said controller makes said compressing/expanding device hold processing of the scanning job by said compressing/expanding device when said print device is printing a first set of the external job, and makes said compressing/expanding device execute processing of the external job and the scanning job by said compressing/expanding device in parallel when said print device is printing a second set of the external job or subsequent set thereof.

13. The data processing apparatus as recited in claim 12, wherein said controller makes said compressing/expanding device execute processing of the external job and that of the scanning job by said compressing/expanding device in parallel by switching the processing of the external job and that of the scanning job in turn.

14. The data processing apparatus as recited in claim 12, wherein said compressing/expanding device includes a plurality of compressors/expanders, and wherein said controller assigns at least one of said compressors/expanders to the processing of the external job and that of the scanning job, respectively, to thereby execute the processing of the external job and the scanning job in parallel.

15. A data processing apparatus, comprising:
an image reader for reading an original;
a receiver capable of receiving an external job transmitted from an outside source;
a transmitter capable of transmitting image data of the original read by said image reader as a scanning job to an outside device;
a print device for printing data of the external job received by said receiver;
a compressing/expanding device for compressing data and expanding the compressed data; and
a controller for controlling execution of processing of the external job and the scanning job by said compressing/expanding device, wherein an ordering of priority of the external job and the scanning job is determined in accordance with execution status indicating whether the external job is a first-set-print job, and the execution of processing the external job and the scanning job is controlled in accordance with the determined ordering priority in cases where a request for processing the data of the external job by said compressing/expanding device and a request for processing the data of the scanning job by said compressing/expanding device overlap;
wherein the first-set-print job comprises a job in which a first set among plural sets is initially printed and the print for the remaining sets is standing by;
wherein, in cases where the external job is a first-set-print job, said controller makes said compressing/expanding device hold processing of the scanning job by said compressing/expanding device when said print device is printing a first set of plural sets of the external job, and execute processing of the scanning job by said compressing/expanding device when the printing of the first set is completed.

16. The data processing apparatus as recited in claim 12, wherein, in cases where the external job is a confidential print job, said controller makes said compressing/expanding device execute processing of the scanning job by said compressing/expanding device if printing of the external job has not started yet.

17. The data processing apparatus as recited in claim 16, wherein, in cases where said print device is printing the external job, said controller makes said compressing/expanding device execute processing of the scanning job by said compressing/expanding device after a completion of the printing of the external job.

18. The data processing apparatus as recited in claim 12, wherein said controller changes a processing style of the external job and that of the scanning job by said compressing/expanding device depending on processing amount of the external job by said compressing/expanding device.

19. The data processing apparatus as recited in claim 18, wherein said controller further changes a processing style of the external job and that of the scanning job by said compressing/expanding device depending on processing amount of the scanning job by said compressing/expanding device.

20. The data processing apparatus as recited in claim 1, wherein an ordering of priority of the external job and the scanning job is determined in accordance with the execution status of the external job, and the execution of processing the external job and the scanning job by said plurality of compressing/expanding device is controlled in accordance with the determined ordering of priority.

21. The data processing method as recited in claim 10, wherein an ordering of priority of the external job and the scanning job is determined in accordance with the execution status of the external job, and the execution of processing the external job and the scanning job by the plurality of compressing/expanding devices is controlled in accordance with the determined ordering of priority.

22. The data processing apparatus as recited in claim 12, wherein an ordering of priority of the external job and the scanning job is determined in accordance with the execution status of the external job, and the execution of processing the external job and the scanning job by said compressing/expanding device is controlled in accordance with the determined ordering of priority.

23. The data processing apparatus as recited in claim 1, wherein the ordering of priority is decided such that a priority is given to any one of data processing of the external job, data processing of the scanning job, and parallel data processing of the external job and the scanning job.

24. The data processing method as recited in claim 10, wherein the ordering of priority is decided such that a priority is given to any one of data processing of the external job, data processing of the scanning job, and parallel data processing of the external job and the scanning job.

25. The data processing apparatus as recited in claim 12, wherein the ordering of priority is decided such that a priority is given to any one of data processing of the external job, data processing of the scanning job, and parallel data processing of the external job and the scanning job.

26. The data processing apparatus as recited in claim 1, wherein the data processing apparatus comprises the plurality of compressing/expanding devices, and the controller includes a mode to simultaneously have one portion of the plurality of compressing/expanding devices execute the scanning job and have another portion of the plurality of compressing/expanding devices execute the external job.

27. The data processing method as recited in claim 10, wherein the data processing apparatus comprises the plurality of compressing/expanding devices, and the controller includes a mode to simultaneously control one portion of the plurality of compressing/expanding devices to execute the scanning job and control another portion of the plurality of compressing/expanding devices to execute the external job.

28. The data processing apparatus as recited in claim 1, wherein the execution status indicating whether the external job is necessary to quickly execute is a status of execution of the second process.

29. The data processing apparatus as recited in claim 2, wherein the execution status indicating whether the external job is necessary to quickly execute is a status of execution of the second process.

30. The data processing apparatus as recited in claim 5, wherein the execution status indicating whether the external job is necessary to quickly execute is a status of execution of the second process.

31. The data processing method as recited in claim 10, wherein the execution status indicating whether the external job is necessary to quickly execute is a status of the execution of the processing of the external job.

32. The data processing apparatus as recited in claim 11, wherein the execution status indicating whether the external job is necessary to quickly execute is a status of the execution of the processing of the external job.

33. The data processing apparatus as recited in claim 12, wherein the execution status indicating whether the external job is necessary to quickly execute is a status of the execution of the processing of the external job.

34. The data processing apparatus as recited in claim 15, wherein the execution status indicating whether the external job is necessary to quickly execute is a status of the execution of the processing of the external job.

\* \* \* \* \*